United States Patent [19]

Raike

[11] Patent Number: 4,812,077

[45] Date of Patent: Mar. 14, 1989

[54] PNEUMATIC/HYDRAULIC WAVE GENERATOR

[75] Inventor: George W. Raike, Ashland, Ohio

[73] Assignee: The Great Wave Company, Inc., Overland Park, Kans.

[21] Appl. No.: 134,091

[22] Filed: Dec. 17, 1987

[51] Int. Cl.[4] ............................ E04H 3/18; E03B 3/00
[52] U.S. Cl. ......................................... 405/79; 4/491; 405/52
[58] Field of Search .................... 405/79, 75, 76, 21, 405/52; 4/490, 491, 496, 497

[56] References Cited

U.S. PATENT DOCUMENTS

| | | | |
|---|---|---|---|
| 3,789,612 | 2/1974 | Richard et al. | 405/79 |
| 4,276,664 | 7/1981 | Baker | 405/79 X |
| 4,515,500 | 5/1985 | Bastenhof | 405/79 |
| 4,558,474 | 12/1985 | Bastenhof | 405/79 |
| 4,561,133 | 12/1985 | Laing | 405/79 |
| 4,730,355 | 3/1988 | Kreinbihl et al. | 405/79 X |

*Primary Examiner*—Dennis L. Taylor
*Attorney, Agent, or Firm*—Litman McMahon & Brown

[57] ABSTRACT

A pneumatic/hydraulic wave generator is associated with the deep end of a swimming pool and includes a pneumatic system with a pair of inner caissons and a pair of outer caissons. The caissons communicate with the swimming pool through a submerged passage. A pneumatic system includes a motor-driven fan which communicates selectively with duct lines to the caissons through a pair of two-position air directional valve assemblies. When the caissons are actuated with pressurized air from the fan, the water levels therein are driven down, creating waves in the swimming pool.

21 Claims, 3 Drawing Sheets

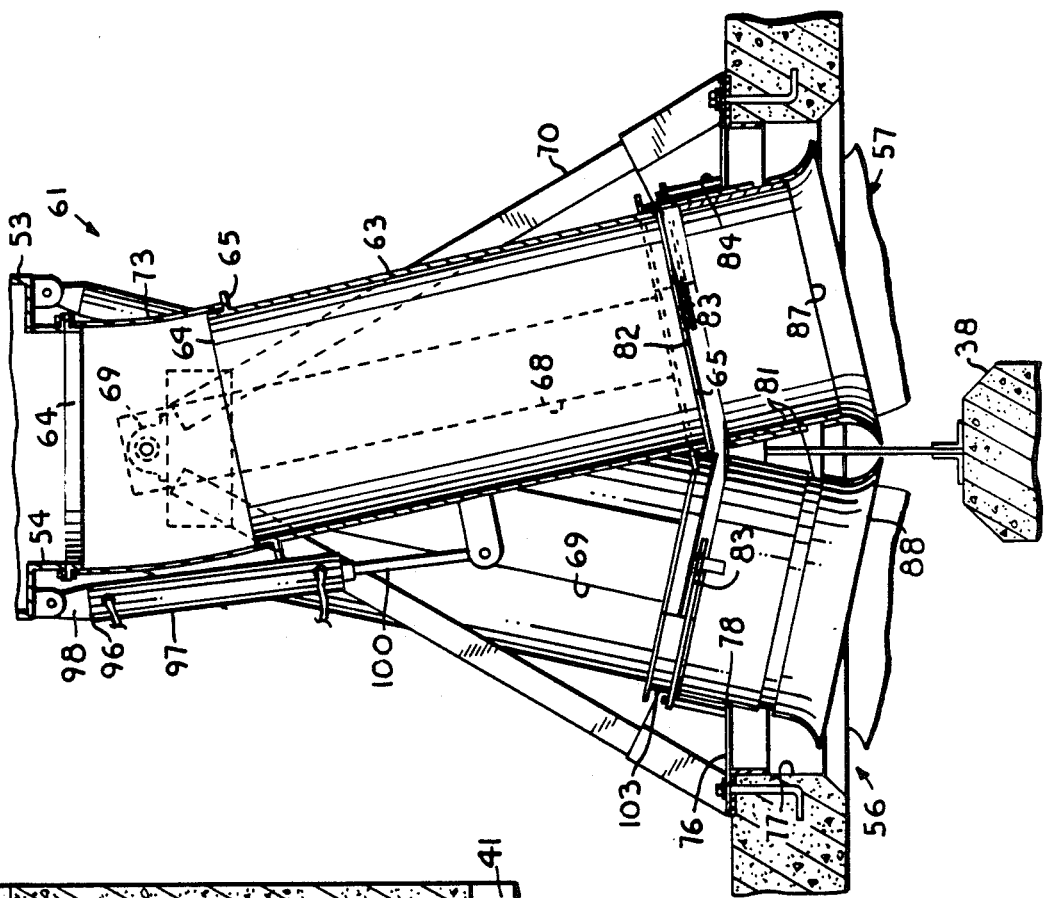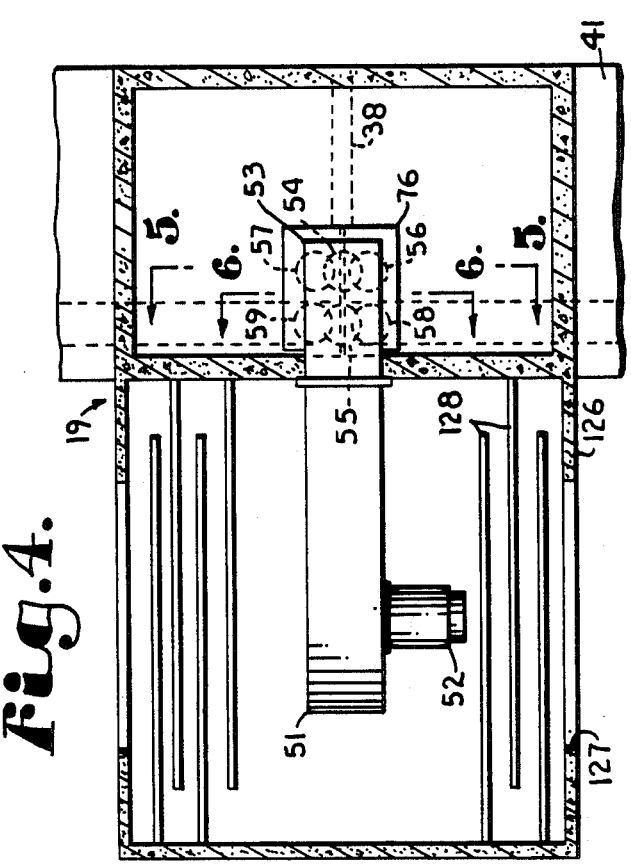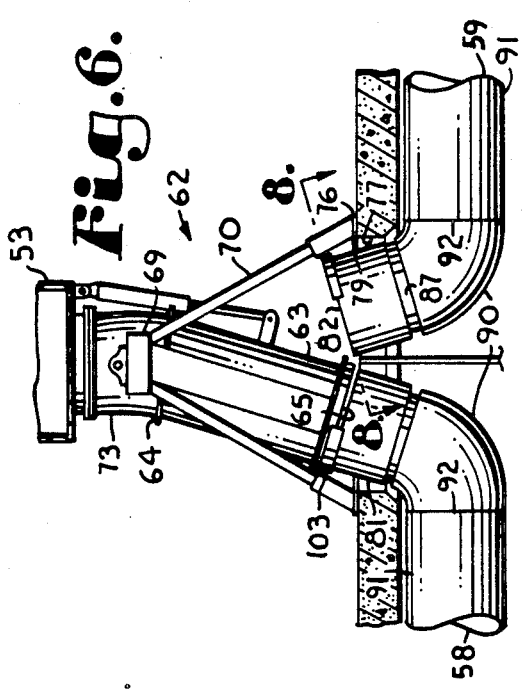

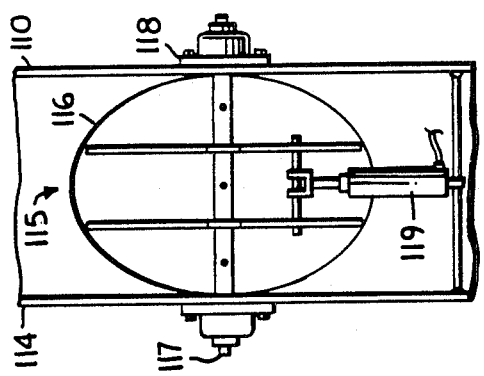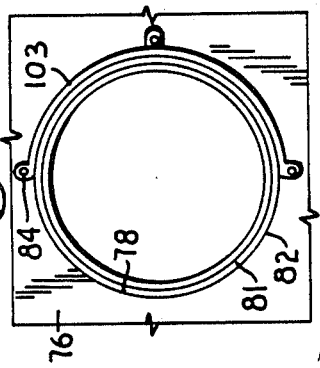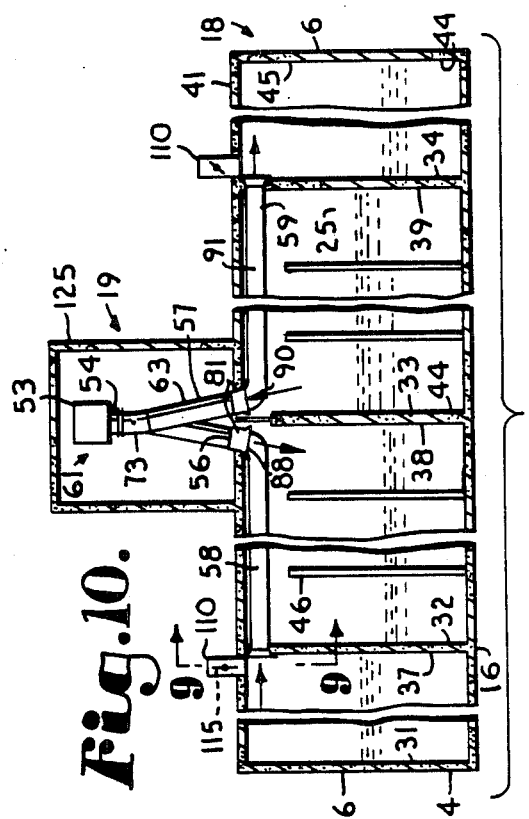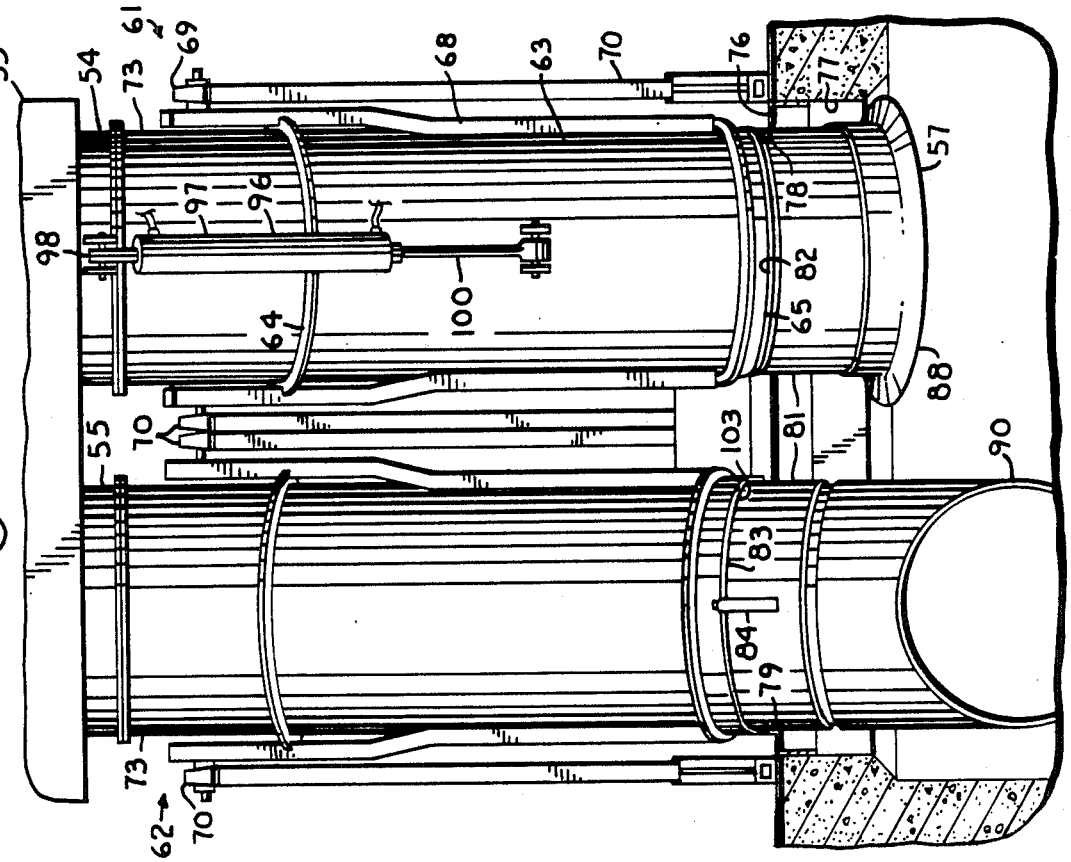

PNEUMATIC/HYDRAULIC WAVE GENERATOR

BACKGROUND OF THE INVENTION

1. Field of the Invention

The present invention relates generally to wave generation, and in particular to a system for pneumatically generating waves in a pool of liquid.

2. Description of the Prior Art

Wave generation in liquids is well known and a variety of systems have heretofore been developed to satisfy the requirements of particular applications. For example, nautical engineers frequently use wave tanks in their design work to simulate sea conditions and study the performance of different hull designs in response to various simulated wave conditions.

Wave generators are also used in recreational applications, for example in swimming pools where mechanically-generated waves are provided to simulate conditions at oceanfront beaches. Swimming pools with wave-making equipment are quite popular, especially in amusement parks that feature a water theme. Depending upon the amplitude and configuration of the waves generated, a variety of activities are possible. For example, the Dexter U.S. Pat. No. 3,473,334 discloses an apparatus and method for producing waves of the spilling breaker type which are suitable for surfing. For normal amusement park operation, however, sinusoidal waves of lesser amplitude are preferred to accommodate bathers with various levels of swimming ability.

Various mechanical devices have heretofore been proposed with moving parts that engage and displace the water at one end of the pool to create a surface wave pattern. For example, movable pallets, swinging gates and immersed blocks have heretofore been employed and have been reciprocated in vertical, horizontal and inclined directions. However, such devices generally include mechanical equipment that is susceptible to rust and corrosion from chlorinated pool water.

The aforementioned Dexter U.S. Pat. No. 3,473,334 shows another type of wave-generating system wherein water is pumped from the pool into an adjoining compartment to a level above the quiescent water level in the pool. A subsurface gate is opened to release the elevated volume of water and generate a wave. However, gate mechanisms such as those shown in the Dexter patent can present construction, operation, corrosion and maintenance problems due to their complexity and the direct contact of their moving parts with the pool water.

Yet another disadvantage with mechanical devices that directly contact the water is that they tend to require relatively large amounts of force to displace sufficient volumes of water to generate useful waves. Furthermore, many such mechanical systems require oil, grease and hydraulic fluid, which can leak and contaminate the swimming pool water.

To avoid some of the aforementioned problems with mechanical wave generators, pneumatic/hydraulic systems have been devised. For example, the Herz U.S. Pat. No. 2,056,855 discloses a fan operated by an electric motor for blowing air into a caisson communicating with a swimming pool whereby waves are generated. Other pneumatic/hydraulic systems are shown in the Schuster et al. U.S. Pat. No. 3,629,877, and each includes a plurality of caissons in communication with a swimming pool. The caissons are pressurized by a plurality of motor-driven air blowers mounted above them. Each air blower is connected to a clapper valve for alternately pressurizing one of a pair of adjacent caissons. Sets of caissons are pressurized and depressurized with the clapper valves in alternating sequence so that a standing wave is formed and extends transversely across the pool, in addition to traveling waves that travel longitudinally through the pool.

Although the pneumatic/hydraulic systems shown in the Schuster et al. patent overcome many of the aforementioned difficulties with prior art wave generators, the Schuster et al. systems tend to be relatively expensive to install and operate since each requires a plurality of air blowers. The present invention addresses these shortcomings.

SUMMARY OF THE INVENTION

In the practice of the present invention, a pneumatic/hydraulic wave generator is provided at a deep end of a swimming pool. The wave generator includes a hydraulic system with a pair of inner caissons and a pair of outer caissons extending across the swimming pool deep end. Each caisson communicates with the swimming pool through a submerged passage. A pneumatic system includes a motor-driven fan mounted in a fan house over the caissons and communicating pressurized air with a manifold. The manifold is selectively connected by air directional valve assemblies to duct lines extending to the caissons. The caissons are actuated with pressurized air from the fan whereby water is displaced therefrom and forms waves in the swimming pool. Displaced air from the caissons is recirculated to the fan house or vented to the atmosphere.

OBJECTS OF THE INVENTION

The principal objects of the present invention are to provide a pneumatic/hydraulic wave generator; to provide such a wave generator for swimming pools and the like; to provide such a wave generator which includes no moving parts in direct contact with the water; to provide such a wave generator which employs pressurized air to form waves; to provide such a wave generator without contaminants in proximity to the water; to provide such wave generator which is capable of actuating multiple air pressurization caissons from a single motor-driven fan; to provide such a wave generator which can be adapted to accommodate different multiples of wave-forming caissons; to provide such a wave generator which provides a relatively high degree of safety; to provide such a wave generator which is relatively economical to construct and operate; to provide such a wave generator which is relatively quiet in operation; to provide such a wave generator with a cooling feature employing outside makeup air; and to provide such a wave generator which is efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is an enlarged, horizontal cross-sectional view of the wave generator taken generally along line 4—4 in FIG. 2.

FIG. 5 is an enlarged, fragmentary, vertical cross-sectional view of the wave generator taken generally along line 5—5 in FIG. 4.

FIG. 6 is an enlarged, vertical cross-sectional view of the wave generator taken generally along line 6—6 in FIG. 4.

FIG. 7 is an enlarged, fragmentary, vertical cross-sectional view of the wave generator taken generally along line 7—7 in FIG. 3.

FIG. 8 is an enlarged, fragmentary, generally horizontal cross-sectional view of the wave generator taken generally along line 8—8 in FIG. 6.

FIG. 9 is an enlarged, fragmentary, vertical cross-sectional view of the wave generator taken generally along line 9—9 in FIG. 3 and particularly showing a relief vent valve assembly.

FIG. 10 is a vertical, cross-sectional schematic view of the wave generator taken generally along line 10—10 in FIG. 1.

DETAILED DESCRIPTION OF THE PREFERRED EMBODIMENTS

Figure 3:
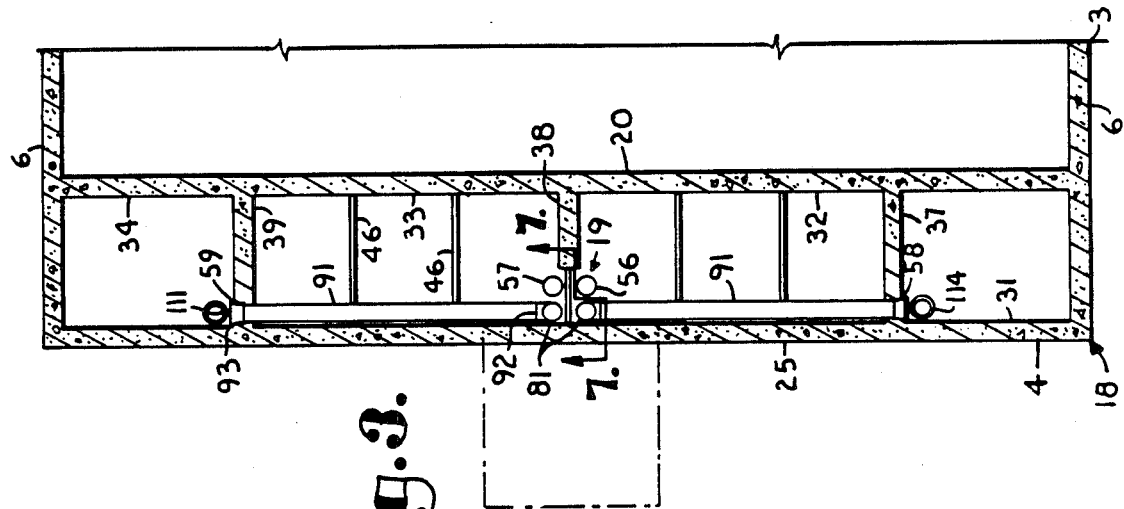
FIG. 3 is a horizontal cross-sectional view of the wave generator taken generally along line 3—3 in FIG. 2.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

I. INTRODUCTION AND ENVIRONMENT

Referring to the drawings in more detail, the reference numeral 1 generally designates a pneumatic/hydraulic wave generator operably associated with a swimming pool 2 and generally comprising a hydraulic system 18 and a pneumatic system 19. The swimming pool 2 includes a deep portion 3 having a substantially square configuration with a deep end 4 and a pair of parallel, deep portion side walls 6.

Figure 2:
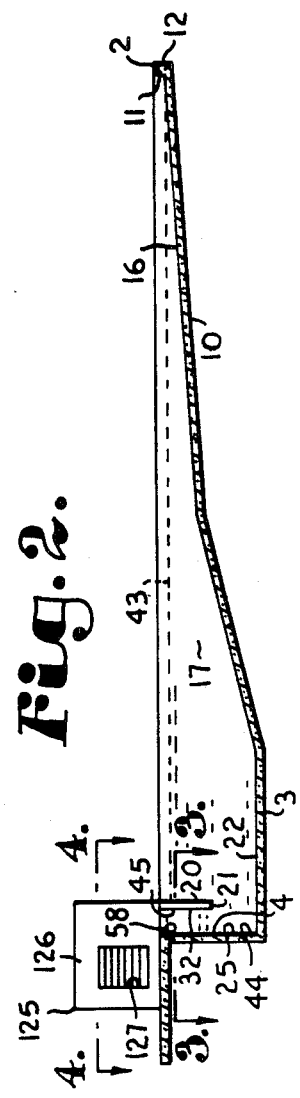
FIG. 2 is a longitudinal cross-sectional view of the 21 wave generator taken generally along line 2—2 in FIG. 1.

The swimming pool 2 also includes a shallow portion 10 having a shallow end 11 longitudinally opposite the deep end 4 and bounded by an arcuate shallow end wall 12. A pair of proximally converging shallow portion side walls 13 extend from respective deep portion side walls 6 to the shallow end wall 12. As shown in FIG. 2, the swimming pool 2 includes a bottom 14 with a greatest depth at the deep end 4 and a least depth at the shallow end 11. At the shallow end 11 the bottom 16 can slope upwardly to a level above a quiescent level 43 of a volume of water 17 in the pool 2 so that a gradual transition from a dry area of the bottom 16 into the swimming pool 2 is provided at the shallow end 11.

II HYDRAULIC SYSTEM

The hydraulic system 18 includes a caisson front wall 20 at the deep end 4 with a lower edge 21 spaced above the pool bottom 16 and forming a submerged passage 22 therebetween. The passage 22 extends transversely across the pool deep end 4 between the side walls 6. A caisson back wall 25 extends transversely between the deep end side walls 6 in parallel, spaced relation behind the caisson front wall 5.

In the exemplary, preferred embodiment of the present invention four caissons 31-34 are shown. 31 and 34 are outer caissons and 32 and 33 are inner caissons. Respective caisson partition walls 37-39 separate caissons 31, 32; caissons 32, 33 and caissons 33, 34 respectively and extend between the caisson front and back walls 20, 25 and to the pool bottom 16. A caisson top slab 41 is placed over the tops of the caissons 31-34 and is supported by the caisson front, back and partition walls 5, 25, 37, 38 and 39. The caissons 31-34 are thus substantially enclosed except at the submerged passage 22 and at openings in the top slab 41 that will be described hereinafter. The quiescent water level 43 in the swimming pool 2 is between and in spaced relation from the pool bottom 16 and the top slab 41 in each caisson 31-34 whereby each caisson 31-34 has a lower, normally submerged portion 44 and an upper air portion 45. Each inner caisson 32, 33 includes a pair of baffles 46 to reduce internal wave formation and to exchange heat between the compressed air and the water volume 17.

III. PNEUMATIC SYSTEM

The pneumatic system 19 includes a fan 51 driven by a motor 52 and operably connected to a manifold 53. The manifold 53 includes front and back outlet ports 54, 55. Front and back air directional valve assemblies 61, 62 are connected to the front and back outlet ports 54, 55 respectively. Each air directional valve assembly 61, 62 includes a pendulum duct section 63 with upper and lower ends 64, 65. Each pendulum duct section 63 is suspended by a suspension subframe 68 from a respective hinge assembly 69 mounted on a support subframe 70 which is in turn connected to the top slab 41. As shown in FIG. 7, a total of four hinged assemblies 69 are provided, all four of which have aligned, longitudinally extending pivotal axes that are centered with respect to the wave generator 1. The pendulum duct section upper ends 64 are connected to the front and back outlet ports 54, 55 respectively by a pair of flexible duct sections 73 that accommodate the swinging movement of the pendulum sections 63.

A pair of front or inner duct lines 56, 57 selectively communicate the inner caissons 32, 33 with the front air directional valve assembly 61 and a pair of back or outer duct lines 58, 59 selectively communicate the outer caissons 31, 34 with the back air directional valve assembly 62. An air directional valve plate 76 is mounted in covering relation over a center opening 77 in the top slab 41 and includes front and back pairs of duct openings 78, 79. Each duct opening 78, 79 slidably receives a respective mating duct section 81 in a relatively tight-fitting engagement. Each mating duct section 81 includes an upper end 82 with an annular rim 83 connected to the plate 76 by adjustment screw assemblies 84. Each mating duct section 81 is mounted on the plate 76 with three adjustment screw subassemblies so that practically infinite angular and height variations can be achieved to provide a close, relatively airtight fit with a pendulum duct section lower end 65.

Each mating duct section 81 also includes a lower end 87. The frontmost pair of mating duct sections 81 mount flared end pieces 88 communicating with respective inner caissons 32, 33. The back pair of mating duct sections 81 are connected to respective elbows 90 at their lower ends 87. A pair of transfer duct sections 91 extend across the inner caissons 32, 33 respectively and each includes an inner end 92 connected to a respective elbow 90 and an outer end 93 extending through a respective caisson partition wall 37, 39 and mounting a respective flared end piece 88 communicating with a respective outer caisson 31, 34.

Each air directional valve assembly 61, 62 is swung between its two extreme positions by a pneumatic piston-and-cylinder unit 96 including a cylinder 97 with an end 98 mounted on the manifold 53 and a piston rod 100 connected to a respective pendulum duct section 63. Extending and retracting the piston-and-cylinder units 96 swings the pendulum duct sections 63 between their respective extreme positions communicating with respective mating duct sections 81. Arcuate stop members 103 are mounted on the outsides of the mating duct sections 81 and project upwardly from their respective upper ends 82 for engagement by the pendulum duct section lower ends 65.

A pair of relief vent valve assemblies 110 extend through respective top slab openings 111 over respective outer caissons 31, 34. Each relief vent valve assembly 110 includes a relief valve duct 114 mounting a butterfly valve subassembly 115 with a valve plate 116 pivotable between opened and closed positions on a hinge pin 117 extending between bearings 118. The butterfly valve subassemblies are actuated by pneumatic piston-and-cylinder units 119. A fan house 125 is provided over the fan and motor 51, 52 and the air directional valve subassemblies 61, 62. The fan house 125 rests partly on the top slab 41 and includes a pair of side walls 126 each having a louvered opening 127. On the fan house 125 interior sound baffles 128 are provided to control the noise emitted from the louvered openings 127.

IV. OPERATION

Figure 1:
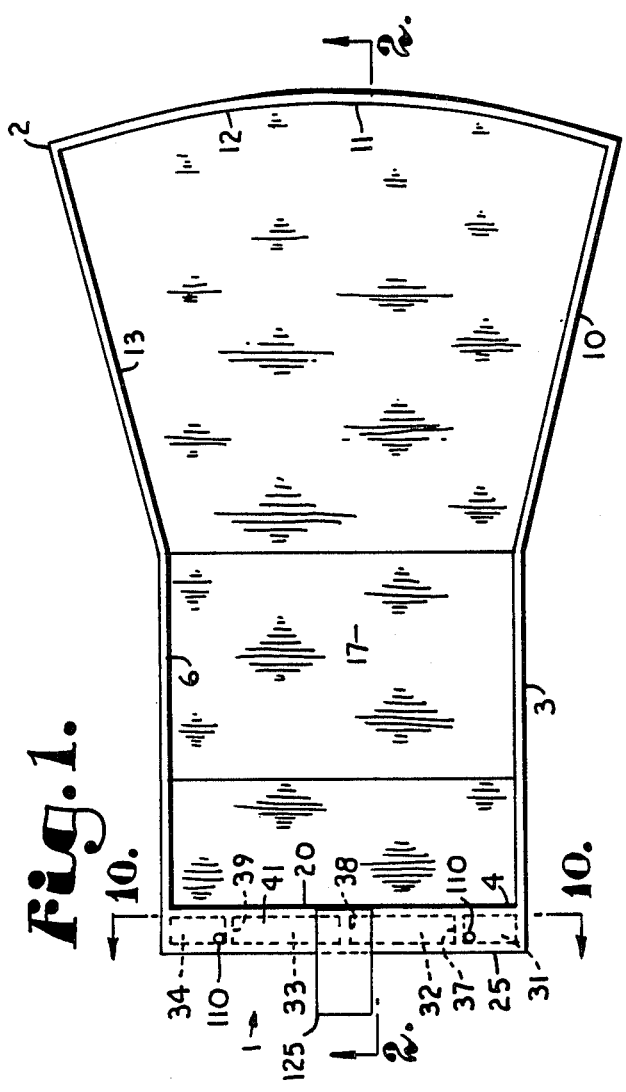
FIG. 1 is a top plan view of a pneumatic/hydraulic wave generator embodying the present invention and associated with a swimming pool.

To create a diamond wave pattern as shown in FIG. 1, caisson pairs 31, 33 and 32, 34 are alternately activated. The pendulum duct sections 63 thus connect with mating duct sections 81 that are diagonally opposite each other in plan. Thus, the caissons 31–34 that are actuated together are not adjacent.

For example, the caissons 31 and 33 are actuated by blowing large volumes of air thereinto through duct lines 57, 58 whereby the water levels in their respective lower, submerged portions are lowered, for example about sixteen inches. The displaced volume of water emerges in front of the caisson front wall 20 as a wave or mound of water above the quiescent water level 43. The air directional valve assemblies 61, 62 are then switched by the power piston-and-cylinder units 96 to actuate the other two caissons 32, 34 through the duct lines 56, 59. The duct lines 57, 58 are thereby opened from the caissons 31, 33 to the interior of the fan house 125. With the air pressure source removed, the water displaced from the caisson submerged portions 44 will naturally be replaced by water rushing through the submerged passage 22. The air thus displaced from the caisson upper air portions 45 will, in the case of the outer caisson 31, vent to atmosphere through a respective open relief vent valve assembly 110 and return to the interior of the fan house 125 through the open duct line 58. The air displaced from the upper air portion 45 of the inner caisson 33 returns to the interior of the fan house 125 through the open duct line 57. The momentum of the resurging water will carry the water level in the caissons 31, 33 slightly (for example about two inches) above the quiescent water level 43 while water is being expelled from the actuated caissons 32, 34. The air directional valve assemblies 61, 62 are then switched again and the cycle repeats itself.

Each relief valve assembly 110 is opened when the other outer caisson 31, 32 is actuated. Air lost to the atmosphere through the relief valve assemblies 110 is made up through the fan house louvered opening 127. Preferably a fair amount of air, for example about one-fourth of the total displaced air volume, is made up in each cycle so that an excessive buildup of heat is avoided. However, it is generally desirable to recirculate some of the air volume so that the pneumatic system 19 can remain relatively closed to avoid excessive noise escapement, especially from the fan 51, the motor 52 and the air directional valve assemblies 61, 62. The sound baffles 128 function to reduce the amount of noise escapement from the fan house 125.

The air directional valve assemblies 61, 62 and the relief valve assemblies 111 are actuated by an electrical control system (not shown). The electrical control system includes a timer for operating the wave generator 1 for predetermined periods of time. It also includes a remote radio-control or switch for the motor 52, for example a portable unit (not shown) accessible to a lifeguard for emergency use.

For wider swimming pools or more transverse standing waves, additional caissons can be provided, preferably in even numbers. Additional air directional valve assemblies can also be provided to actuate the additional caissons from the central pneumatic system 19.

Another advantage of venting the end caissons 31, 34 is that not all of the displaced air must leave through the duct lines 58, 59 where it might collide with the rush of incoming air for the next cycle. Given the relatively large volumes of air that are moved and the relatively short actuation time (e.g. about 1.3 seconds of actuation), it is desirable to avoid reversing airflow direction as much as possible. The piston-and-cylinder units 96 and 119 are preferably pneumatic rather than hydraulic to avoid fluid leakage and contamination of the water 17 in the swimming pool 2.

The control system can sequence the shifting of the air directional valve assemblies 61, 62 to create a wave pattern other than the diamond pattern shown in FIG. 1, if desired. For example, the adjacent caissons 31, 32 on one side of the wave generator 1 can be actuated together and the adjacent caissons 33, 34 on the other side of the wave generator 1 can be actuated together whereby parallel waves about half the width of the pool deep end 4 would be formed in staggered, alternating sequence. Furthermore, all of the caissons 31–34 can be actuated at different times in a predetermined or random sequence.

It is to be understood that while certain forms of the present invention have been illustrated and described herein, it is not to be limited to the specific forms or arrangement of parts described and shown.

What is claimed and desired to be secured by Letters Patent is as follows:

1. A pneumatic/hydraulic wave generator, which comprises:
   (a) a hydraulic system including first and second caissons each having:
      (1) an upper end;
      (2) a lower end; and
      (3) an open passage at said lower end; and
   (b) a pneumatic system including:
      (1) blower means;
      (2) a manifold communicating with said blower means;
      (3) a first duct line communicating with said first caisson;
      (4) a second duct line communicating with said second caisson;
      (5) an air directional valve assembly having a first position communicating said manifold with said first duct line and a second position communicating said manifold with said second duct line;
      (6) said air directional valve assembly including actuating means adapted for moving said air directional valve assembly between its first and second positions; and
      (7) a relief valve assembly selectively communicating one of said caissons with the atmosphere.

2. The wave generator according to claim 1, which includes:
   (c) said air directional valve assembly having a pendulum duct section with upper and lower ends;
   (d) said upper end communicating with said manifold; and
   (e) said pendulum duct section being movable between first and second positions with said lower end communicating with said first and second duct lines respectively.

3. The wave generator according to claim 2 wherein:
   (f) said air directional valve actuating means comprises a pneumatic piston-and-cylinder unit connected to said manifold and said pendulum duct section.

4. The wave generator according to claim 2, which includes:
   (f) said air directional valve assembly having a flexible duct section interconnecting said manifold and said pendulum duct section upper end.

5. The wave generator according to claim 2 wherein:
   (f) each said duct line includes a mating duct section with an upper end adapted for selective registry with said pendulum duct section lower end.

6. The wave generator according to claim 5 wherein:
   (g) each said mating duct section includes an arcuate stop member mounted on its upper end and selectively engaging said pendulum duct section lower end.

7. The wave generator according to claim 5, which includes:
   (g) a pair of vertically adjustable mounting means each mounting a respective mating duct section for vertical adjustment with respect to said pendulum duct section.

8. The wave generator according to claim 7 wherein:
   (h) each said vertically adjustable mounting means includes three adjustment screw assemblies adapted for raising, lowering, and adjusting the pitch of a respective mating duct section.

9. The wave generator according to claim 1 wherein:
   (c) each said relief valve assembly includes a relief valve duct having a butterfly valve subassembly positioned therein and movable between open and closed positions.

10. The wave generator according to claim 9 wherein:
    (d) said relief valve assembly includes relief valve actuating means for moving said butterfly valve subassembly between its open and closed positions.

11. The relief valve assembly according to claim 10 wherein:
    (e) said relief valve assembly includes actuating means comprising a pneumatic piston-and-cylinder unit connected to said butterfly valve subassembly.

12. The wave generator according to claim 1 wherein:
    (c) each said caisson includes a vertical baffle extending from its lower end to a level in spaced relation below its upper end.

13. In combination with a pool having deep and shallow ends and containing a volume of liquid with a quiescent liquid surface level, the improvement of a wave generator, which comprises:
    (a) a hydraulic system including:
       (1) a pair of outer caissons positioned in spaced relation at opposite sides of said pool deep end;
       (2) a pair of juxtaposed, adjacent inner caissons positioned between said outer caissons at said deep end;
       (3) each said caisson having a lower submerged portion and an upper air portion; and
       (4) an underwater passage communicating said caisson submerged portions with said pool; and
    (b) a pneumatic system including:
       (1) a fan;
       (2) a motor drivingly connected to said fan;
       (3) a manifold communicating with said fan;
       (4) an inner pair of duct lines each communicating with a respective inner caisson;
       (5) an outer pair of duct lines each communicating with a respective outer caisson;
       (6) a first air directional valve assembly communicating with said manifold and having a first position communicating with one of said inner duct lines and a second position communicating with the other said inner duct line;
       (7) a second air directional valve assembly having a first position communicating with one of said outer duct lines and a second position communicating with the other said outer duct line; and
       (8) a pair of relief valve assemblies each selectively communicating a respective outer caisson with the atmosphere.

14. The wave generator according to claim 13, which includes:
    (c) each said air directional valve assembly including a pendulum duct section with an upper end communicating with said manifold and a lower end selectively communicating with one of said duct lines.

15. The wave generator according to claim 14 wherein:
    (d) each said air directional valve assembly includes actuating means for moving said air directional valve assembly between its first and second positions.

16. The wave generator according to claim 15 wherein:

(a) each said air directional valve assembly actuating means comprises a pneumatic piston-and-cylinder unit connected to said manifold and to a respective pendulum duct section.

17. The wave generator according to claim 14 wherein:
 (a) each said air directional valve assembly includes a flexible duct section interconnecting said manifold and said pendulum duct section upper end.

18. The wave generator according to claim 14 wherein:
 (d) each said duct line includes a mating duct section with an upper end adapted for selective registry with a respective pendulum duct section lower end.

19. The wave generator according to claim 18, which includes:
 (e) a plurality of vertically adjustable mounting means each mounting a respective mating duct section for vertical adjustment with respect to a respective pendulum duct section.

20. The wave generator according to claim 13, which includes:
 (c) remote radio control switch means adapted for selectively activating and deactivating said motor.

21. In combination with a pool having deep and shallow ends and containing a volume of liquid with a quiescent liquid surface level, the improvement of a wave generator, which comprises:
 (a) a hydraulic system including:
  (1) a pair of outer caissons positioned in spaced relation at opposite sides of said pool deep end;
  (2) a pair of juxtaposed, adjacent inner caissons positioned between said outer caissons at said pool deep end;
  (3) each said caisson having a lower submerged portion and an upper air portion;
  (4) an underwater passage communicating said caisson submerged portions with said pool;
  (5) a pair of vertical baffles each located in a respective inner caisson and extending at least partly into its submerged portion and at least partly into its upper air portion; and
  (6) a top slab enclosing said caissons on top and including a duct line opening over said inner caissons; and
 (b) a pneumatic system including:
  (1) a fan;
  (2) a motor drivingly connected to said fan;
  (3) a fan house enclosing said fan and motor and having a pair of louvered openings;
  (4) a pair of baffles each positioned between a respective louvered opening and said fan;
  (5) a manifold communicating with said fan;
  (6) an inner pair of duct lines each communicating with a respective inner caisson and including a mating duct section with an upper end;
  (7) an outer pair of duct lines each communicating with a respective outer caisson and including a mating duct section with an upper end;
  (8) a first air directional valve assembly including a pendulum duct section having an upper end and a lower end, said pendulum duct section being movable between a first position whereat its lower end registers with one of said inner duct line mating duct section upper ends and a second position whereat said lower end registers with the other of said inner duct line mating duct section upper ends;
  (9) a second air directional valve assembly including a pendulum duct section having an upper end and a lower end, said pendulum duct section being movable between a first position whereat its lower end registers with one of said outer duct line mating duct section upper ends and a second position whereat said lower end registers with the other of said outer duct line mating section upper ends;
  (10) each said air directional valve assembly including a respective flexible duct section interconnecting said manifold and a respective pendulum duct section upper end;
  (11) a pair of hinge assemblies each pivotably mounting a respective pendulum duct section for swinging movement between its first and second positions;
  (12) a duct opening plate positioned in covering relation over said top slab opening and having a plurality of duct line openings therein, each said duct line opening receiving a respective mating duct section;
  (13) a pair of piston-and-cylinder units each connected to said manifold and a respective pendulum duct section for moving said pendulum duct section between its first and second positions;
  (14) four vertically adjustable mounting means each mounting a respective mating duct section on said duct line opening plate for vertical adjustment with respect to a respective pendulum duct section, each said vertically adjustable mounting means including three adjustment screw assemblies adapted for raising and lowering a respective mating duct section and adjusting the pitch thereof; and
  (15) a pair of relief valve assemblies each including a relief valve duct communicating with a respective outer caisson and the atmosphere and a butterfly valve subassembly positioned therein and movable between open and closed positions.

* * * * *